United States Patent
Leen et al.

(10) Patent No.: US 10,782,228 B2
(45) Date of Patent: Sep. 22, 2020

(54) SIMULTANEOUS INTEGRATED CAVITY OUTPUT SPECTROSCOPY AND RINGDOWN MEASUREMENTS FOR THE DETECTION OF BROAD BAND ABSORBING GAS SPECIES

(71) Applicant: ABB Schweiz AG, Baden (CH)

(72) Inventors: J. Brian Leen, Sunnyvale, CA (US); Axel Kramer, Wettingen (CH); Xu Du, San Jose, CA (US)

(73) Assignee: ABB Schweiz AB, Baden (CH)

( * ) Notice: Subject to any disclaimer, the term of this patent is extended or adjusted under 35 U.S.C. 154(b) by 356 days.

(21) Appl. No.: 15/800,582

(22) Filed: Nov. 1, 2017

(65) Prior Publication Data

US 2019/0128799 A1    May 2, 2019

(51) Int. Cl.
| | |
|---|---|
| *G01N 21/3504* | (2014.01) |
| *G01N 21/39* | (2006.01) |
| *G01N 21/359* | (2014.01) |
| *G01J 3/10* | (2006.01) |
| *G01J 3/42* | (2006.01) |

(52) U.S. Cl.
CPC ............ *G01N 21/3504* (2013.01); *G01J 3/10* (2013.01); *G01J 3/42* (2013.01); *G01N 21/359* (2013.01); *G01N 21/39* (2013.01); *G01N 2021/399* (2013.01)

(58) Field of Classification Search
CPC ............................ G01N 21/39; G01N 21/3504
USPC ...................................................... 250/339.13
See application file for complete search history.

(56) References Cited

U.S. PATENT DOCUMENTS

| | | | | |
|---|---|---|---|---|
| 5,459,574 | A * | 10/1995 | Lee | G01N 21/39 356/437 |
| 7,301,639 | B1 * | 11/2007 | Kebabian | G01N 21/031 356/437 |
| 2004/0245441 | A1 * | 12/2004 | Pieterse | G01D 5/35303 250/227.14 |
| 2008/0111993 | A1 * | 5/2008 | Miller | G01N 21/39 356/437 |
| 2009/0014670 | A1 * | 1/2009 | Cole | G01J 3/42 250/573 |

OTHER PUBLICATIONS

International Search Report and Written Opinion for PCT/US2018/058650, dated Mar. 22, 2019, 16 pages.

(Continued)

*Primary Examiner* — David P Porta
*Assistant Examiner* — Abra S Fein
(74) *Attorney, Agent, or Firm* — Barnes & Thornburg LLP

(57) ABSTRACT

Systems and methods for measuring a value of constituents in a mixed constituent gas having at least one broad band absorber constituent therein and at least one lock constituent are provided. The system uses a combination of integrated cavity output spectroscopy and cavity ringdown spectroscopy to determine the measurement values of constituents in a cavity of a spectrometer. Cavity ringdown in the presence of the at least one broadband absorber constituent and a reference concentration value are used to determine the constituent measurement values when the spectral width of the laser tuning range is overlapped by the absorption band of the broad band absorber in the cavity.

25 Claims, 5 Drawing Sheets

(56) References Cited

OTHER PUBLICATIONS

Martinez et al., "Laser-locked, high-repition-rate cavity ringdown spectrometer", Optical Society of America, vol. 23, No. 4/Apr. 2006, pp. 727-740.
O'Keefe, "Integrated cavity output analysis of ultra-weak absorption", Chemical Physics Letters 293 (1998) 331-336.
He et al., "Ringdown and cavity-enhanced absorption spectroscopy using a continuous-wave tunable diode laser and a rapidly swept optical cavity", Chemical Physics Letters 319 (2000) 131-137.

* cited by examiner

SIMULTANEOUS INTEGRATED CAVITY OUTPUT SPECTROSCOPY AND RINGDOWN MEASUREMENTS FOR THE DETECTION OF BROAD BAND ABSORBING GAS SPECIES

FIELD OF INVENTION

The present application is directed to integrated cavity output spectroscopy and cavity ringdown measurements, and multimodal usage of such spectroscopy.

BACKGROUND

Cavity Ringdown Spectroscopy (CRDS) is a powerful tool for the detection and quantification of small optical absorbers. Most CRDS instruments use single mode ringdown instead of multimode to maximize sensitivity. However, there are many applications where low cost, moderate sensitivity is required but the laser wavelength must be maintained to ensure accurate and interference free measurements. One example of this is the measurement of broad band absorber species in next generation gas-insulated switchgear. Moreover, as $SF_6$-alternatives start to become adopted by utilities, demand for commissioning and service equipment capable of quantifying measurements such as the concentrations of the gas constituents is increasing. Even so, CRDS requires an accurate wavelength to ensure that the laser ringdown event occurs at the correct wavelength. CRDS instruments typically use an expensive and complicated wavelength monitor for this purpose.

SUMMARY

A system for determining a measurement value of constituents in a mixed constituent gas having at least one broad band absorber constituent therein and at least one lock constituent. The system has: a cavity for receiving the mixed constituent gas species; a laser for providing a light beam of a specific spectral position and width in the cavity, the laser configured to be tuned across a spectral width wherein a spectral ending point of the laser tuning range is locked relative to a wavelength and frequency of an absorption line of the at least one lock constituent; a plurality of mirrors for providing reflection of the light beam within the cavity; a detector for measuring the light beam; and a processing unit for determining the measurement value of constituents based on cavity ringdown in the presence of the at least one broadband absorber constituent and a reference concentration value when the cavity is free of the at least one broad band absorber constituent; and wherein the spectral width of the laser tuning range is overlapped by the absorption band of the broad band absorber in the cavity, and wherein a temporal light intensity decrease due to absorption of the broad band constituent is determined as light exits the cavity during a cavity ringdown.

A method for determining a measurement value of a broad band absorber constituent in a gas mixture, having the following steps: reflecting a light beam in a cavity bounded by at least one mirror, the cavity containing the broad band absorber constituent and at least one lock constituent present in the mixed constituent gas; measuring absorbance of the light beam in the cavity after interacting with the gas mixture; determining, by a processor, at least one absorption peak of the at least one lock constituent in the mixed constituent gas; locking a spectral position of the light beam relative to a wavelength and frequency of the absorption peak of the at least one lock constituent; measuring light intensity decay over time as the broadband absorber constituent absorbs radiation in the form of at least one ringdown trace value; and determining, by the processor, the measurement value of the broad band absorber constituent based on the ringdown trace in the presence of the broad band absorber constituent, and a cavity reference value representing a ringdown of the cavity without the broad band absorber constituent.

A method for determining a measurement value of a broad band absorber constituent in a gas mixture, the method the following steps: reflecting a light beam in a cavity bounded by at least one mirror, the cavity containing a gas mixture having the broad band absorber constituent present in the mixed constituent gas; injecting a lock constituent into the mixed constituent gas in the cavity; measuring the absorbance of the light beam in the cavity as the light beam interacts with the gas mixture and exits through a mirror out of the cavity; determining one of an absorption peak and a trough of the lock constituent in the mixed constituent gas; locking the spectral position of the light beam relative to the wavelength and frequency of the absorption peak of the at least one lock constituent; measuring light intensity decay over time as the broadband absorber constituent absorbs radiation in the form of at least one ringdown trace; and determining, by a processor, the measurement value of the broad band absorber constituent based on the cavity ringdown trace in the presence of the broad band absorber constituent and a cavity reference value representing the internal volume without the broad band absorber constituent.

BRIEF DESCRIPTION OF THE DRAWINGS

In the accompanying drawings, structural embodiments are illustrated that, together with the detailed description provided below, describe exemplary embodiments of combined integrated cavity output spectroscopy (ICOS) and CRDS using the locking of the laser wavelength used for ringdown measurement with the aid of a lock constituent whose narrow absorption line is accommodated by a broader absorption line of a broad band absorber. One of ordinary skill in the art will appreciate that a single component illustrated in the drawings may be designed as multiple components in other embodiments and/or or that multiple components illustrated in the drawings may be designed as a single component in other embodiments.

Further, in the accompanying drawings and description that follow, like parts are indicated throughout the drawings and written description with the same reference numerals, respectively. The figures are not drawn to scale and the proportions of certain parts have been exaggerated for convenience of illustration.

In FIG. 6B, the ringdown occurs earlier than in FIG. 6A;

DETAILED DESCRIPTION

Cavity Ringdown Spectroscopy (CRDS) requires an accurate wavelength to ensure that the laser ringdown event occurs at the correct wavelength. CRDS instruments typically use an expensive and complicated wavelength monitor to lock the wavelength to the correct value. The approach that is presented herein does not require such equipment but, instead, utilizes one or more nearby narrow-band absorbers (<10 GHz) to maintain a consistent ringdown wavelength. The peak position of the nearby narrow-band absorbers are measured using Integrated Cavity Output Spectroscopy (ICOS) and the measured peak position is used as feedback in a proportional/integral/differential (PID) loop that maintains the ringdown wavelength position. By placing the ringdown wavelength over an absorber of interest whether narrowband or broadband, the absorber can be accurately quantified. By maintaining the ringdown wavelength, measurement inaccuracy due to variable absorber depth is avoided. In some embodiments, position feedback schemes other than PID can be used to lock the ringdown probe frequency using narrow band absorption. For example, proportional only (P), proportional/integral (PI), proportional/differential (PD), or fuzzy logic feedback schemes may be used as alternatives to PID.

Furthermore, interference with nearby narrow-band absorbers is minimized or eliminated by fixing the wavelength and correcting for the fitted concentration of the narrowband absorber. An application which can benefit from such measurement of broadband absorber constituents is found in next-generation gas-insulated switchgear.

Cavity enhanced absorption spectroscopy (CEAS) is widely used to quantify trace gases, finding applications in environmental science, industrial process control, medical, national defense and other sectors. Typically, CEAS uses at least two high reflectivity mirrors to trap light in a sample cavity. The light is reflected back and forth within the cavity, creating a very long effective path length and increasing the interaction path length between light and matter. In this manner, the optical absorption of weak absorbers can be detected and used to quantify measurements such as the concentration of very low concentrations or weakly absorbing gases, partial pressure and number density of the gases.

Figure 1:
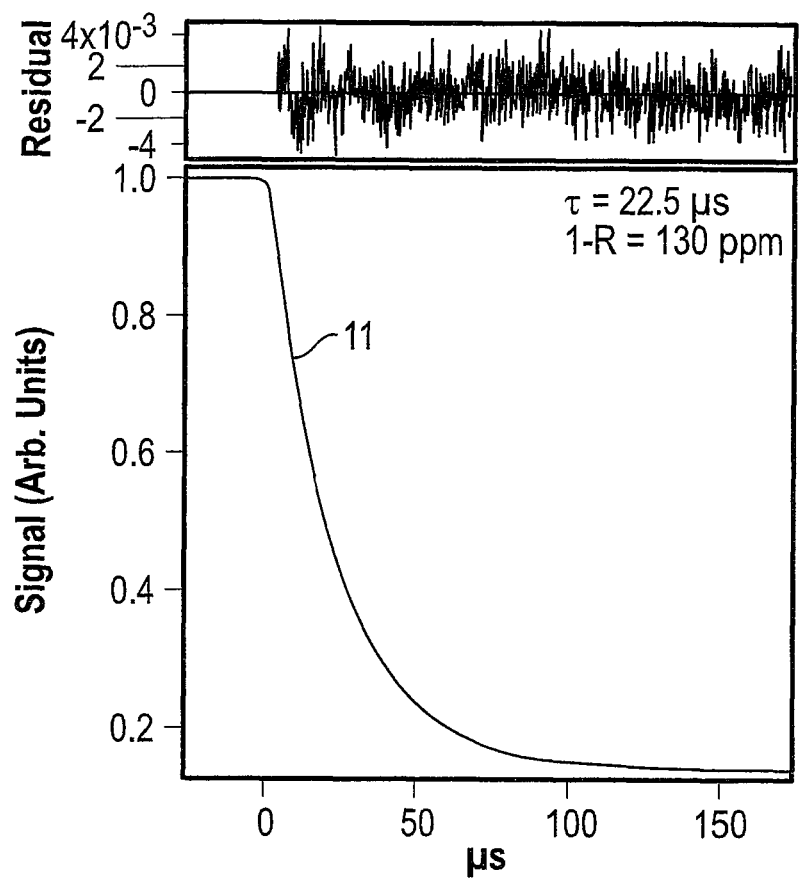
FIG. 1 depicts an example ringdown trace with exponential fit.

There are currently two dominant methods of CEAS: CRDS and ICOS. With reference to FIG. 1, CRDS is a first generation CEAS method where light is injected into the cavity and then the light source, such as a laser or light-emitting diode is abruptly turned off. After the source is turned off, the light energy within the cavity begins to decay from either absorption, scattering or transmission in the gas and at the mirror surface. The decay 11 of the measured light intensity follows an exponential form and is known as the ringdown. The time constant of the exponential decay 11 is denoted by $\tau$ and can be calculated from Eq. 1:

$$\tau = \frac{L}{2c(1 - Re^{-\alpha L})} \quad (1)$$

where L is the cavity length, R is the mirror reflectivity and $\alpha$ is the absorption per unit length.

Further, the concentration of the gas can be found using by Eq. 2:

$$\text{Concentration} = \frac{a_1}{c}\left[\frac{1}{\tau} - \frac{1}{\tau_0}\right]\frac{T}{P} \quad (2)$$

where $a_1$ is a calibration constant, c is the speed of light, $\tau_0$ is the empty cavity ringdown time, T is the gas temperature and P is the gas pressure. In one embodiment, $\tau_0$ to can be measured at the factory and used for all future calculations.

A significant drawback of CRDS is that the ringdown time is only measured at a single wavelength at a time. Due to small, uncontrolled temperature changes or aging of the laser, the probe wavelength may be moved away from the original position, however, in order to accurately measure ringdown absorption this wavelength must be known or somehow maintained. In order to measure multiple species or to measure spectrally overlapping species (i.e., interfering species), the wavelength must be tuned accurately and rapidly. Because of the requirement to accurately control the laser wavelength, prior CRDS systems typically use expensive and complicated wavelength monitors to measure and lock the laser wavelength, thus increasing the manufacturing costs and introducing failure modes into field operations.

A further complication of CRDS is that the ringdown times of higher order transverse cavity modes differ slightly and can interfere with the $TEM_{00}$ mode. Due to this effect, most CRDS implementations go to great lengths (e.g., mode matching, temperature stabilization, vibration isolation, etc.) to ensure that only the $TEM_{00}$ mode is allowed in the cavity. However, this is not absolutely necessary and acceptable ringdown measurements for many applications can be achieved if many transverse modes are excited simultaneously as in multi-mode CRDS. There are several advantages to multi-mode CRDS over single mode CRDS because the TEM mode does not have to be strictly maintained, the manufacturing tolerances are lower, it is easier and faster to align and the system is resistant to misalignment caused by vibration or temperature and pressure changes. However, the maximum possible measurement precision is better for single mode CRDS than for multi-mode CRDS.

Figure 2:
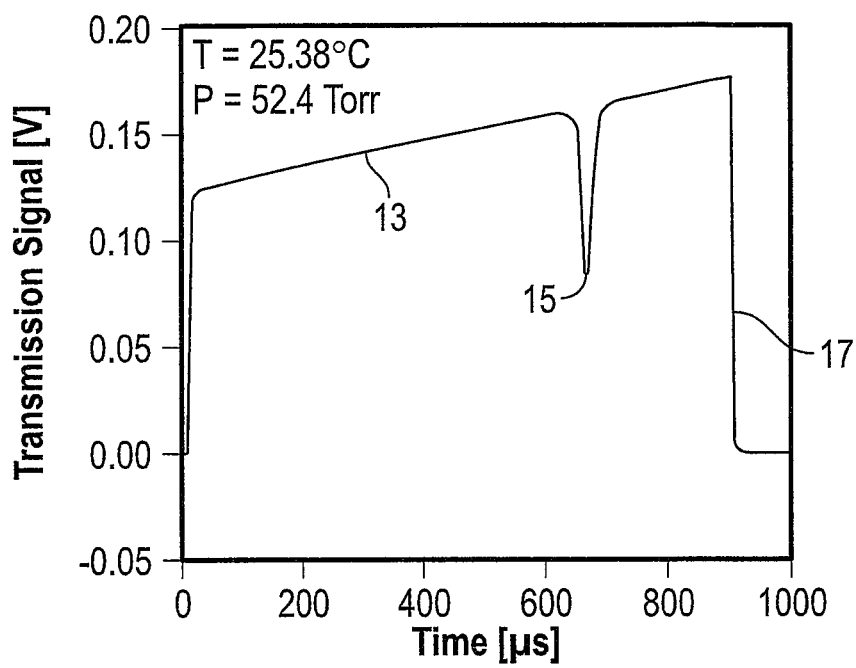
FIG. 2 depicts an example integrated cavity output spectroscopy.

ICOS is the other commonly used CEAS. In ICOS, instead of turning off the laser abruptly to measure absorption at a single wavelength as with CRDS, the laser is tuned across a wavelength region of interest at a rate slow enough that the light passing through the cavity reaches a pseudo-steady state and the ICOS power transmission 13 through the cavity is measured, as seen for example in FIG. 2. When the laser wavelength passes over an optical absorber, the transmitted light decreases (for example, at 15 in FIG. 2).

As with multi-mode CRDS, interference between TEM modes is suppressed in ICOS by sourcing light into a very large number of higher order transverse modes resulting in a washing out of mode noise interference, both in the ICOS signal and in the ringdown at the end of the trace. In most implementations of ICOS, the ringdown 17 at the end of the trace is used to measure the reflectivity, R, of the mirrors and thus determine the effective path length of the cavity using Eq. 1. This can be used to either determine gas concentrations from first principles or to correct small changes in mirror reflectivity during field service.

Figure 8:
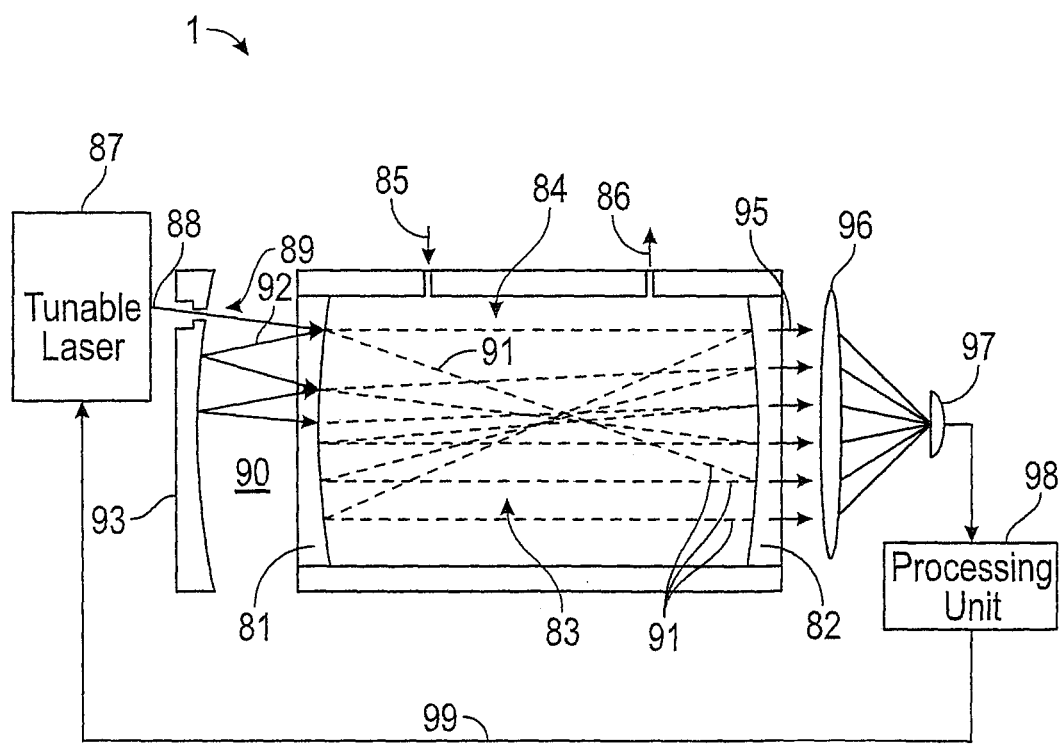
FIG. 8 is a block diagram of an integrated cavity ringdown spectroscopy system for determining a measurement value of constituents in a mixed constituent gas having at least one broad band absorber constituent therein.

The present disclosure utilizes the method of CRDS measurements along with the use of a spectral peak measured with ICOS to lock the laser wavelength and without the need for an external wavelength monitor. Here, "locking" refers to achieving always the same frequency in the moment of switching-off the laser for the start of a ringdown measurement. With reference to FIG. 8, the spectrometer system 1 has a CEAS cavity 83 with two or more mirrors 81, 82, etc. forming a stable optical resonator, a tunable laser source 87 appropriate for CEAS spectroscopy, a detector 97 for measuring intensity passing out of the CEAS cavity 83, and a processing unit 98 having a data acquisition system, a processor for numerical analysis, and memory. It should be understood that the at least one mirror 81, 82, etc. may be a mirror that extends over the circumference of a ring cavity having the gas mixture therein or the mirrors 81, 82 bound opposing ends of the cavity 83 in an axial manner as shown in FIG. 8. Typically, the steps of performing a spectral scan are the following: (1) turning on the laser 87, (2) scanning the laser frequency across a narrow-band absorber and (3) abruptly turning off the laser 87 shortly after detection of the narrow-band frequency to that ringdown occurs at a desired wavelength of the broadband absorption analyte of interest (e.g. using feedback control 99 from the processing unit 98 to adjust the turnoff point in relation to a narrowband absorption peak). Multiple scans can be averaged, before and/or after analysis to improve the measurement results. The $\tau_0$ value can be determined by evacuating the CEAS cell or by filling it with a broadband absorber-free gas such at zero air or $N_2$, among other methods.

In one embodiment, light 92 is reinjected into the cavity 83, as described in U.S. Pat. No. 7,468,797, the entirety of which is incorporated by reference herein. For example, a CRDS or ICOS system utilizes multiple reflections of the injection optical beam back onto the off-axis cavity mirror. Because the reflectivity of the cavity mirror 81 is nearly unity, the light 92 reflected from the cavity mirror 81 and thereby failing to couple into the optical cavity 83 is only slightly decreased in amplitude from the previous injection attempt. A re-injection mirror 93 is positioned to collect this light 92 and reflect it back toward the off-axis cavity mirror 81. With a suitable choice of the optical parameters, a large number of back reflections can be produced. After a large number of repeated injections of the input light 91, the coupling efficiency of the input light can effectively be multiplied by a factor of from 2 to several orders of magnitude.

The peak location used for locking can be determined from the measured spectra using a simple peak finder, a quadratic fit to the local peak or more complicated spectral line shape fits to the measured data. The peak location within the spectral scan region, and thus the ringdown probe wavelength, is fixed by using a PID feedback loop to adjust a laser characteristic such as temperature or current. Thus, in one implementation we lock the laser frequency to the absorption line of the narrow-band absorber (e.g. water) by adjusting the temperature of the laser diode (e.g. using a feedback loop 99 from the processing unit 98 seen in FIG. 8). The prominent water absorption peak will be locked always at a specific point in the spectral scan. Since the width of the spectral sweep is unchanged in this implementation, it indirectly results in locking of the ringdown wavelength. The wavelength of the spectroscopic lock-peak used for locking is determined by the physical properties of the measured molecule and, therefore, provides a reference. Alternatively, a trough location of a spectral scan region of the lock constituent may be used to lock the wavelength. This method enables the detection and quantification of broad band absorbers with an accuracy that cannot be achieved with unlocked CRDS or ICOS alone. Additionally, because the peak is measured using ICOS, the concentration, partial pressure and number density of the lock molecule can be quantified to increase the utility of the analyzer. By way of non-limiting example, peak-lock molecules include $H_2O$, $CO_2$, $CH_4$, $N_2O$, $O_2$, $O_3$, $NO_2$, NO, HF, CO, $NH_3$, $H_2S$, HCl, $C_2H_6$, $C_2H_4$, $C_2H_2$, $H_2O_2$, OCS, and others with relatively few atoms. $H_2O$, for example, absorbs throughout much of the near infrared spectral region and is nearly ubiquitous. The method described herein utilizes multi-mode CRDS instead of single mode CRDS, thus improving manufacturability, robustness and serviceability.

Figure 3:
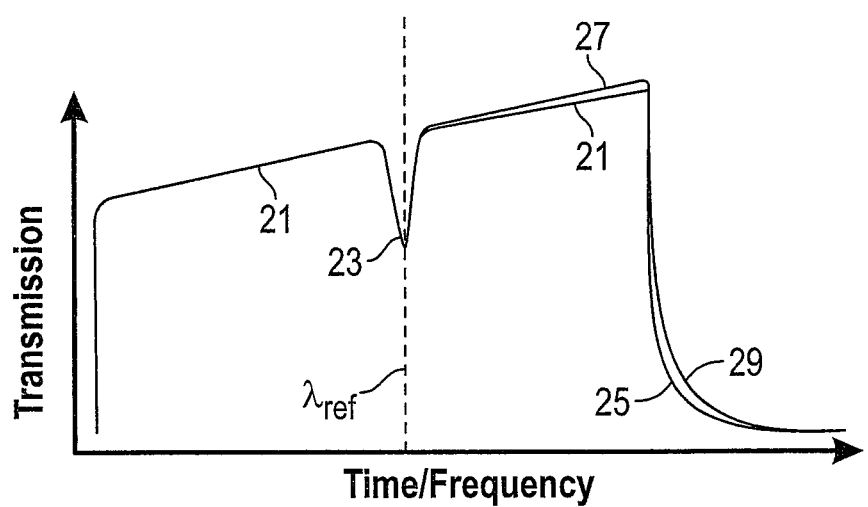
FIG. 3 depicts a diagram of a hybrid ringdown ICOS spectrum in transmission space.
Figure 4:
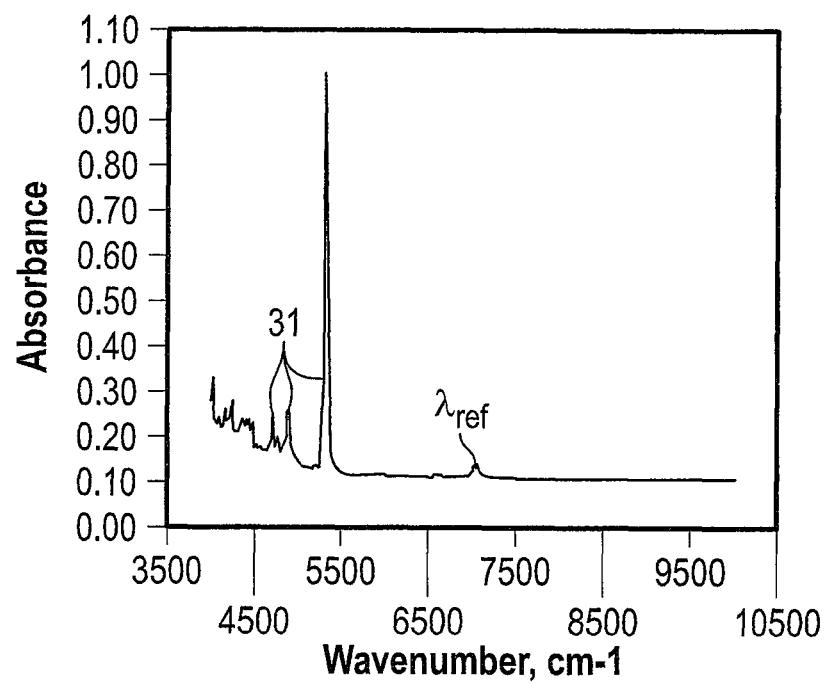
FIG. 4 depicts the near-infrared absorption spectrum of 1,1,1,3,4,4,4-heptaflouro-3-(trifluoromethyl)butan-2-one)

A diagrammatic example according to the present disclosure is shown in FIG. 3. The laser is tuned so that the narrow ICOS absorption peak used for frequency locking (seen as a measured intensity trough 23 in the power transmission 21) occurs within the scan range. The lock frequency $\lambda_{ref}$ is selected such that the ringdown 25 occurs at a wavelength shortly after this absorption feature 23 of the broadband absorber. The quantification of broadband absorbers with current-tuned semiconductor lasers is achievable using the combination of ringdown measurements with ICOS measurements. Comparison with the ICOS power transmission 27 and ringdown 29 with a sample containing only the narrowband lock molecule can serve as a calibration reference. A broadband absorber constituent here is defined as a molecular species that has at least one spectral absorption feature in its optical absorption spectrum with a spectral width at low pressure that is greater than the spectral tuning range of the investigating laser in a tunable diode laser absorption spectroscopy (TDLAS) analyzer. By way of non-limiting example, a reference low pressure is less than or equal to a total cavity pressure of 200 torr, the tuning range is approximately 0.5 nanometers and the spectral absorption feature of the broad band absorber constituent at 7079 $cm^{-1}$, perfluoroketone Novec-5110, has a width of 17 nanometers FWHM (full width at half maximum). The lock constituent, $H_2O$, in the present example, has a spectral width (FWHM) at approximately five percent of the spectral tuning range of the investigating laser. The laser is tuned across a spectral range that covers both the ringdown probe wavelength of the broad band absorber constituent and the spectral peak of the lock constituent. With reference to FIG. 4, the width of the absorption feature of the broadband absorber constituent, Novec-5110, is 1,000 times larger than the peak $\lambda_{ref}$ of the corresponding lock constituent, $H_2O$, by way of non-limiting example.

Examples of lasers that are contemplated by the present disclosure are near-infrared distributed feedback lasers, interband cascade lasers (ICLs) and quantum cascade lasers (QCLs). For each of these lasers there are many gas species that have absorption features that are spectrally broader than the accessible current tuning range of the laser. Because the absorption band is too wide, current ICOS analyzers typically do not attempt to measure these because it is difficult or impossible to measure the baseline absorption. CRDS analyzers sometimes attempt to measure these species but with the previously mentioned drawback of requiring an external wavelength monitor.

Figure 5:
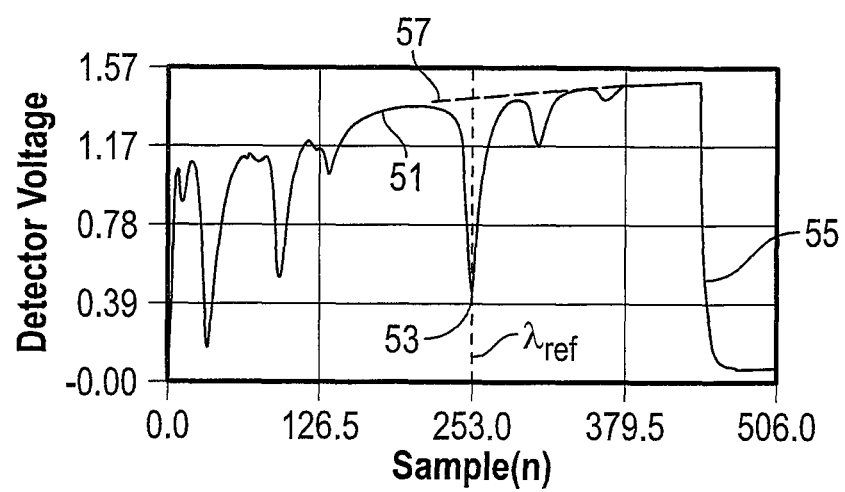
FIG. 5 depicts an example water and 1,1,1,3,4,4,4-heptaflouro-3-(trifluoromethyl)butan-2-one) absorption spectrum and ring-down trace in the near infrared region (around 7079 $cm^{-1}$), showing the ringdown decay after the laser has been switched off.

A previously mentioned, one embodiment of a broad band absorber to which the present disclosure may be applied is $C_5F_{10}O$ (C5-PFK). C5-PFK mixed with carrier gas (such as air or $CO_2$) represents an alternative to $SF_6$ for use in gas insulated switchgear (GIS). Since this alternative insulation gas is a mixture of gases, it is necessary to be able to determine the concentration of the various components, in particular that of the C5-PFK, in order to ensure safety and functionality of the electrical apparatus. Therefore, analyzers are required to accurately measure the C5-PFK concentration in the GIS. C5-PFK has several absorption bands throughout the NIR spectral region as shown in FIG. 4, many of which are near large $H_2O$ absorption bands, $H_2O$ being a gas species of interest in gas-insulated switchgear applications. An example of a spectral location where C5-PFK and $H_2O$ absorptions occur in near proximity is shown in FIG. 5, wherein an ICOS measurement scan 51 of the tunable laser diode from an example spectral region around 7079 cm$^{-1}$ is depicted. The reference absorption 53 at $\lambda_{ref}$ from the $H_2O$ molecules (or other narrowband locking molecule) serves to lock the ringdown measurement 55 at a desired nearby wavelength. (The corresponding ICOS power transmission for an empty cavity is shown at 57.) By way of non-limiting example, other candidates as alternatives for $SF_6$ and/or broad band absorbing constituents in gas-insulated electrical apparatus that can be quantified using the methods and systems described herein include an organofluorine compound, such organofluorine compound being selected from the group consisting of: a fluoroether, an oxirane, a fluoroamine, a fluoroketone, a fluoroolefin, a fluoronitrile, and mixtures and/or decomposition products thereof. Herein, the terms "fluoroether", "oxirane", "fluoroamine", "fluoroketone", "fluoroolefin", and "fluoronitrile" refer to at least partially fluorinated compounds. In particular, the term "fluoroether" encompasses both fluoropolyethers (e.g. galden) and fluoromonoethers as well as both hydrofluoroethers and perfluoroethers, the term "oxirane" encompasses both hydrofluorooxiranes and perfluorooxiranes, the term "fluoroamine" encompasses both hydrofluoroamines and perfluoroamines, the term "fluoroketone" encompasses both hydrofluoroketones and perfluoroketones, the term "fluoroolefin" encompasses both hydrofluoroolefins and perfluoroolefins, and the term "fluoronitrile" encompasses both hydrofluoronitriles and perfluoronitriles. It may be preferred that the fluoroether, the oxirane, the fluoroamine, the fluoroketone and the fluoronitrile are fully fluorinated, i.e. perfluorinated.

In some embodiments, the dielectric insulation medium or more specifically the organofluorine compound in the dielectric insulation medium or gas is selected from the group consisting of: fluoroethers, in particular a or several hydrofluoromonoether(s); fluoroketones, in particular a or several perfluoroketone(s); fluoroolefins, in particular a or several hydrofluoroolefin(s); fluoronitriles, in particular a or several perfluoronitrile(s); and mixtures thereof.

In particular, the term "fluoroketone" as used in the context of the present invention shall be interpreted broadly and shall encompass both fluoromonoketones and fluorodiketones or generally fluoropolyketones. Explicitly, more than a single carbonyl group flanked by carbon atoms may be present in the molecule. The term shall also encompass both saturated compounds and unsaturated compounds including double and/or triple bonds between carbon atoms. The at least partially fluorinated alkyl chain of the fluoroketones can be linear or branched and can optionally form a ring.

In some embodiments, the dielectric insulation medium has at least one compound being a fluoroketone, which may optionally include heteroatoms incorporated into the carbon backbone of the molecules, such as at least one of: a nitrogen atom, oxygen atom and sulphur atom, replacing a corresponding number of carbon atoms. More preferably, the fluoromonoketone, in particular perfluoroketone, can have from 3 to 15 or from 4 to 12 carbon atoms and particularly from 5 to 9 carbon atoms. Most preferably, it has exactly 5 carbon atoms and/or exactly 6 carbon atoms and/or exactly 7 carbon atoms and/or exactly 8 carbon atoms.

In some embodiments, the dielectric insulation medium has at least one compound being a hydrofluoroether selected from the group consisting of: hydrofluoro monoether containing at least three carbon atoms; hydrofluoro monoether containing exactly three or exactly four carbon atoms; hydrofluoro monoether having a ratio of number of fluorine atoms to total number of fluorine and hydrogen atoms of at least 5:8; hydrofluoro monoether having a ratio of number of fluorine atoms to number of carbon atoms ranging from 1.5:1 to 2:1; pentafluoro-ethyl-methyl ether; 2,2,2-trifluoro-ethyl-trifluoromethyl ether; and mixtures thereof.

In some embodiments, the dielectric insulation medium has at least one compound being a fluoroolefin selected from the group consisting of: hydrofluoroolefins (HFO) having at least three carbon atoms, hydrofluoroolefins (HFO) having exactly three carbon atoms; general HFOs with a sum formula $C_3H_2F_4$ or $C_3HF_5$; 1,1,1,2-tetrafluoropropene (HFO-1234yf; also named 2,3,3,3-tetrafluoro-1-propene), 1,2,3,3-tetrafluoro-2-propene (HFO-1234yc), 1,1,3,3-tetrafluoro-2-propene (HFO-1234zc), 1,1,1,3-tetrafluoro-2-propene (HFO-1234ze), 1,1,2,3-tetrafluoro-2-propene (HFO-1234ye), 1,1,1,2,3-pentafluoropropene (HFO-1225ye), 1,1,2,3,3-pentafluoropropene (HFO-1225yc), 1,1,1,3,3-pentafluoropropene (HFO-1225zc), (Z)1,1,1,3-tetrafluoropropene (HFO-1234zeZ; also named cis-1,3,3,3-tetrafluoro-1-propene), (Z)1,1,2,3-tetrafluoro-2-propene (HFO-1234yeZ), (E)1,1,1,3-tetrafluoropropene (HFO-1234zeE; also named trans-1,3,3,3-tetrafluoro-1-propene), (E)1,1,2,3-tetrafluoro-2-propene (HFO-1234yeE), (Z)1,1,1,2,3-pentafluoropropene (HFO-1225yeZ; also named cis-1,2,3,3,3 pentafluoroprop-1-ene), (E)1,1,1,2,3-pentafluoropropene (HFO-1225yeE; also named trans-1,2,3,3,3 pentafluoroprop-1-ene), and mixtures thereof.

Some embodiments may also encompass: general polyfluorinated oxiranes with a sum formula $C_4F_8O$, in particular polyfluorinated oxirane, i.e. 2,3-(difluoro-2,3-bis(trifluoromethyl) oxirane.

Some embodiments may encompass hydrochlorofluoroolefin, i.e. 1-chloro-3,3,3-trifluoropropene, in particular the trans-isomer of 1-chloro-3,3,3-trifluoropropene, i.e. HCFO-1233zd, Z1336mzz, E-1438ezy, E-1233zd, isopentanes, HFCs, in particular: 1,1,1,4,4,4-Hexafluor-2-Buten ($C_4H_2F_6$), specifically cis-1,1,1,4,4,4-Hexafluor-2-Buten or trans-1,1,1,4,4,4-Hexafluor-2-Buten; 1,1,1,2,3,3,3-heptafluoropropane or pentafluoroethane or 1,1,1,2-tetrafluoroethane, Hexamethyldisiloxane, 2-trifluoromethyl-3-ethoxy-dodecafluorohexane (CAS: 297730-93-9), 4-trifluoromethyl-3-methoxy-decafluoropentane (CAS: 132182-92-4), hexafluoro-1,1,1,2,3,35 4-(1,1,2,3,3,3-hexafluoropropoxy) pentane (CAS: 870778-34-0), octafluoro-2-butene (CAS number: 360-89-4), and mixtures thereof.

In some embodiments, the organofluorine compound can also be a fluoronitrile, in particular a perfluoronitrile. In particular, the organofluorine compound can be a fluoronitrile, specifically a perfluoronitrile, containing two carbon atoms, and/or three carbon atoms, and/or four carbon atoms.

More particularly, the fluoronitrile can be a perfluoroalkylnitrile, specifically perfluoroacetonitrile, perfluoropropionitrile ($C_2F_5CN$) and/or perfluorobutyronitrile ($C_3F_7CN$). Most particularly, the fluoronitrile can be perfluoroisobutyronitrile (according to the formula $(CF_3)_2CFCN$) and/or perfluoro-2-methoxypropanenitrile (according to formula $CF_3CF(OCF_3)CN$). Of these, perfluoroisobutyronitrile (i.e. 2,3,3,3-tetrafluoro-2-trifluoromethyl propanenitrile alias i-C3F7CN) may be particularly preferred due to its low toxicity.

The dielectric insulation medium can further contain a background gas or carrier gas different from the organofluorine compound (in particular different from the fluoroether, the oxirane, the fluoroamine, the fluoroketone, the fluoroolefin and the fluoronitrile) and can in embodiments be selected from the group consisting of: air or air component (s), such as $N_2$, $O_2$, $CO_2$, a noble gas, and/or $H_2$; nitrogen oxides, in particular $NO_2$, $NO$, $N_2O$; fluorocarbons, in particular perfluorocarbons, such as $CF_4$; $CF_3I$, $SF_6$; and mixtures thereof. Any mixture containing at least one of the components or organoflurorine compounds or background gas components selected from any of the various lists disclosed herein is herewith also disclosed.

Further examples of uses of the simultaneous ringdown and ICOS measurements include the measurement of higher order hydrocarbons in the 3 μm spectral region, which can be useful for fuel value measurements. Also, volatile organic compounds (VOCs) such as benzene, toluene, ethylbenzene and xylene (BTEX), refrigerants, formaldehyde, acrolein, and chemical warfare agents in the MIR fingerprint region (roughly 4-12 μm) can be measured using the simultaneous ringdown and ICOS measurements. By way of non-limiting example, refrigerants include but are not limited to: R-134a, R-12, R-11, and R-22. When refrigerant measurement values are being made by the spectrometer, the measurement values are used for leak detection in a system or component. Examples of chemical warfare agents include but are not limited to: sarin, vx, including the entire v-series of nerve gas agents, mustard gas, phosgene, tabun, soman, and cyclosarin. Other applications of the simultaneous ringdown and ICOS system include obtaining measurement values of 2,4,6-trinitrotoluene, 1,3,5-Trinitroperhydro-1,3,5-triazine, Pentaerythritol tetranitrate, octogen, peroxyacetone, and 2,4-Dinitrotoluene in a medium.

Dielectric insulation fluids are widely applied to insulate electrically active parts in a variety of electrical switching devices such as GIS, transformers or gas-insulated lines (GIL). In case of GIS, the electrically active part in medium or high voltage metal-encapsulated switchgear is arranged in a gas-tight compartment which encloses an insulation gas with pressure ranges of 1.2-1.4 bar (medium voltage) and 5-12 bar (high voltage). The gas electrically separates the encapsulation from its electrically active part. A commonly used dielectric insulation gas is sulfur hexafluoride ($SF_6$) which exhibits excellent insulation and electric arc extinguishing capabilities. However, $SF_6$ is a strong contributor to the green-house effect and thus has a high global warming potential (GWP). Several alternative insulation fluids of significantly lower GWP compared to $SF_6$ have been identified, and some of the alternative insulation fluids are multi-component fluid mixtures, i.e., more than one molecular or atomic species. It is found that the composition of such insulation fluid mixtures is critical to the safe operation of the electrical apparatus, because both the dielectric breakdown strength and dew point of the insulation fluid is strongly composition and total pressure dependent.

Among the proposed candidates for $SF_6$ alternatives, the perfluoroketones (PFKs) with 5 or 6 carbon atoms (C5-PFK, C6-PFK) mixed with carrier gases, such as $N_2/O_2$ or $CO_2/O_2$, appear to be most promising. C5-PFK-based mixtures, available under the tradename AirPlus, are available from ABB. In particular, perfluoroketone, 1,1,1,3,4,4,4-heptafluoro-3-(trifluoromethyl)butan-2-one), herein "C5-PFK", is a proposed candidate for $SF_6$ replacement. C5-PFKs have good dielectric properties, and, contrary to $SF_6$, C5-PFKs only have a low impact on global warming and are rapidly degraded in the atmosphere.

In a mixture of gases, determining the concentration of the various constituents, particularly C5-PFK, ensures safety and functionality of the electrical apparatus. A measurement concept using pressure, temperature and density of the gas mixture to determine the gas concentration of C5-PFKs in carrier gases, by treating the gas as a binary mixture has been considered. However, the optical method presented herein provides the concentration of C5-PFKs and the underlying optical concept has the advantage that it is specific to the interrogated molecular species. In particular, the quantification of C5-PFK in air using a nearby water absorption line is possible using the simultaneous ringdown and ICOS measurements presented herein. Thus, an unambiguous concentration determination is provided and is unaffected by potential gaseous impurities or developing decomposition products. Further, a single instrument can provide ringdown and ICOS measurements without a wavelength monitor.

The breakdown strength of a dielectric insulation gas depends on the dielectric properties of its constituents and on the density of the gas molecules. In a gas mixture the different components contribute by different degrees to the dielectric insulation strength. In devices using only one gas component the insulation performance can be monitored with a simple density (or pressure/temperature) measurement. However, this straightforward method is not applicable for a multi component gas mixture, and so the problem of finding a way for accurate determination of the concentration of each individual gas component arises. The composition of a mixture may change over time as a result of gas degradation, e.g., due to arcing in a circuit breaker or due to undesired partial discharge activity. Furthermore, gas degradation can occur due to chemical reactions with materials of the GIS or with the ingress of constituents such as $H_2O$ in humid environments. Preferential leakage of one gas component over another can also degrade insulation performance over time. Thus, information about the gas composition is important for switchgear development and the piloting phase of new products.

The present system can measure the broad band absorber constituent without errors associated with shifting wavelength. Further, by accurately fixing the ringdown probe wavelength using a narrow-band absorption line of a gas species in the analyte gas mixture, the system can eliminate or correct cross-sensitivity with the narrow band absorber constituent which may be the lock constituent. It is possible to fit to multiple narrow band absorption peaks in the spectral region and utilize an average or mean value determined therefrom or a group frequency shift as a frequency lock feedback parameter.

In certain applications, a narrow band absorber constituent is not present in the gas mixture. The narrow band absorber may be injected into the analyte gas mixture. The injected gas is chosen such that it exhibits sufficient narrow band absorption lines in the spectral region of the broad band absorber constituent that a frequency locking can be performed.

It is possible to fit the narrow band absorber peak using a variety of different approaches. While the most common is to fit analytic spectroscopic line shapes using a Levenberg- Marquardt non-linear minimization or other minimization technique it is also possible to fit the narrow band or otherwise structure the spectrum using a previously measured basis set. Using an appropriate minimization algorithm, the basis set is scaled, skewed, shifted and/or stretched to minimize the difference between the basis set model and the measured data. The shifted position can also be used as a frequency lock in the same way as a single narrow band absorber constituent. Such minimization techniques are useful when there is overlapping of absorption bands of various molecules present in a gas mixture or detection in off-band areas where certain molecules exhibit weak absorption bands or spectra.

Figure 6A:
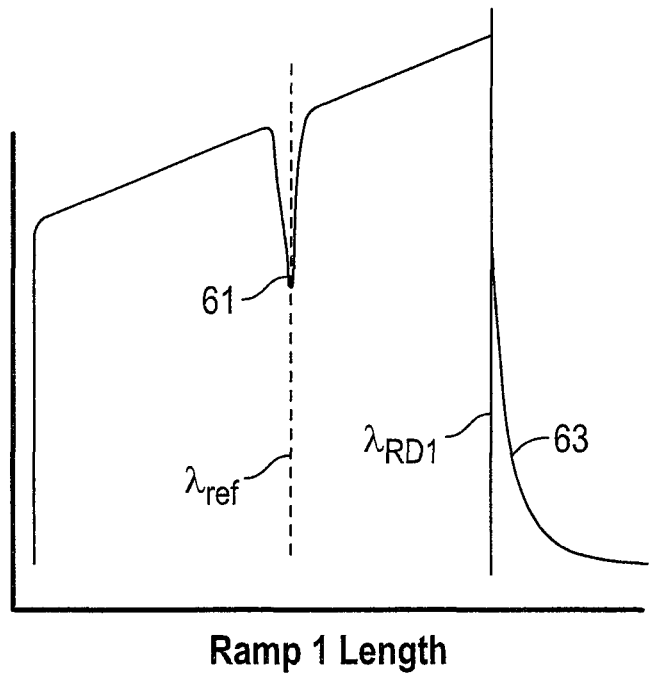
FIGS. 6A and 6B are diagrams of ringdown measurements at multiple ringdown probe locations using different ramp lengths.
Figure 6B:
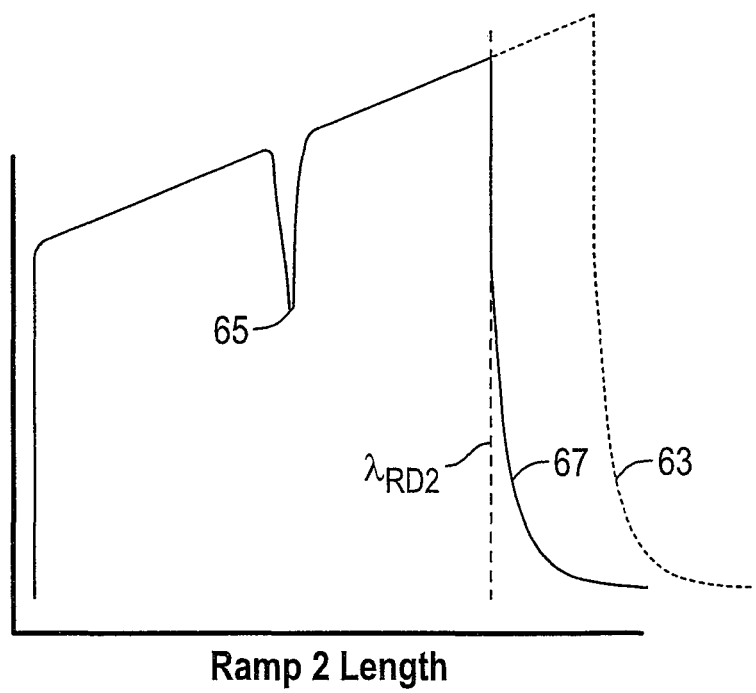

With reference now to FIGS. 6A and 6B, a laser is generally turned on and off several hundred times per second. Each of these on/off cycles (ramps) will typically have the same length so that the probe frequency for the ringdown measurement 63 is always the same. (The absorption trough 61 for the narrowband lock molecule serves as the reference wavelength $\lambda_{ref}$.) However, a short (less than 100 elements), repeating pattern of different ramp lengths 65 can be used instead of a single ramp length to probe multiple ringdown frequencies (e.g., at 67 in FIG. 6B, which occurs earlier, i.e. at a shorter wavelength, than ringdown 63 of FIG. 6A). Measuring the ringdown at multiple wavelengths makes it possible to quantify more than one broad band absorber in a mixture, provided they have measurably different absorption structures at the probe wavelengths. The frequency tuning rate will differ slightly between each ramp length, but this can be accounted for with appropriate pre-measured etalon calibrations. The impact of this modification is shown in FIG. 6.

The value of the time constant $\tau_0$ for empty cavity ringdown is needed to find the loss attributable to the target broad band absorber. After factory calibration of the measurement cell of the instrument (spectrometer), it is possible to measure $\tau_0$ in the field in a number of ways. One way in which to measure $\tau_0$ is by evacuating the CEAS cell using a vacuum pump such that the residual contribution of broad band absorber is below the accuracy required by the application. Another way to determine $\tau_0$ is by filling the cavity with a non-absorbing gas such as zero air, synthetic air, cryogenic zero air, $N_2$, argon, $CO_2$, etc. Many zero absorber gases are usable, provided they do not absorb appreciably at the ringdown probe frequency. A sample that is free of the broad band absorber constituent should be, used, e.g., if the broad band absorber constituent is measured in air, zero air should be used for determining $\tau_0$. However, other gases may be used, provided pressure broadening and differences in Rayleigh scattering are accounted for. For some applications it is preferable to perform a periodic measurement of $\tau_0$. This recalibration can be automatic at desired time intervals provided that the required non-absorbing gas (such as $N_2$ or technical air or environmental air) is available at the analyzer location.

Another approach is to determine the value of $\tau_0$ in order to find the loss attributable to the target broad band absorber. It is possible to obtain this value after factory calibration by chemically or catalytically scrubbing the target broad band absorber constituent from the gas sample. $NO_2$ is an example of a species that can be scrubbed, and U.S. Pat. No. 8,654,334 is hereby incorporated by reference herein, for describing a process for scrubbing the target broad band absorber constituent.

Figure 7:
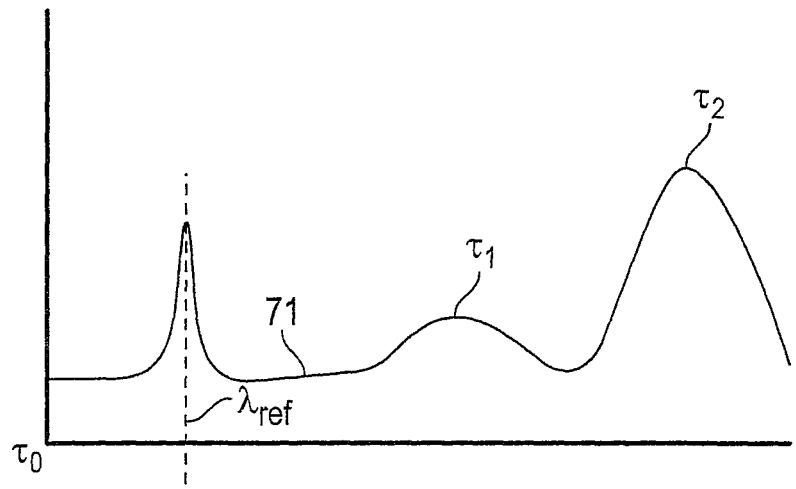
FIG. 7 is an example of using a structured absorber to measure concentration without directly measuring $\tau_0$.

The value of $\tau_0$ may be determined by measuring at least two ringdown values because the ratio of difference $\tau_1$ to $\tau_2$ and $\tau_1$ to $\tau_0$ to are known or previously measured. An example of such measurements 71 of $\tau_1$ and $\tau_2$ is shown in FIG. 7 which uses a structured absorbing constituent for measuring concentration without requiring a $\tau_0$ measurement. For instance, $\tau_1-\tau_2=A(\tau_0-\tau_1)$, where A is a calibration coefficient, may be employed to determine the value of $\tau_0$ without broad band absorber constituent, constituent-free gas, cavity evacuation, scrubbing or other cavity background methods, since $\tau_2$ is also measured, the broad band absorber constituent concentration can be calculated.

The value of $\tau_0$ may be determined by measuring at least one ring up value as $\tau_1$ and/or $\tau_2$ which represents the buildup of light in the cavity when a light beam 91 is directed into the cavity. In this manner, the ring up and/or ring down values are used to determine $\tau_0$ and ultimately concentration, partial pressure, and number density of at least one constituent in the multi-constituent mixture. A method to measure a value of a broad band absorber constituent in a mixture having multiple constituents using at least one ring up value has the following steps.

A light beam 91 is reflected in a cavity having a mixed constituent gas with at least one broad band absorber constituent and at least one lock constituent therein. The absorbance of the light beam 91 in the cavity is measured after the light beam 91 has interacted with the mixture. A processor is used to determine at least one absorption peak of the at least one lock constituent in the mixed constituent gas. The spectral position of the light beam 91 is locked relative to a wavelength and frequency of the absorption peak of the at least one lock constituent. The light intensity buildup in the cavity is measured as a ring up value. The light intensity decay in the cavity is measured as a ring down value. The processor is then used to determine the measurement value of the broad band absorber constituent based on at least two of the following values: the ring up value in the presence of the broad band absorber constituent, the ring down value in the presence of the broad band absorber constituent and a cavity reference value without the broad band absorber constituent. The measurement value of the broad band absorber constituent includes but is not limited to concentration of the at least one constituent in the mixed constituent gas, partial pressure of at least one constituent, number density of the at least one constituent in the gas mixture, and any or all of the foregoing measurement values. It should be understood that continuous concentration of the broad band absorber constituent may be determined from the measured ring up and ring down values of the broad band absorber constituent.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application illustrates various embodiments, and while these embodiments have been described in some detail, it is not the intention of the applicant to restrict or in any way limit the scope of the appended claims to such detail. Additional advantages and modifications will readily appear to those of ordinary skill in the art. Therefore, the invention, in its broader aspects, is not limited to the specific details, the representative embodiments, and illustrative examples shown and described. Accordingly, departures may be made from such details without departing from the spirit or scope of the applicant's general inventive concept.

What is claimed is:

1. A system for determining a measurement value of one or more constituents in a mixed constituent gas comprising at least one broad band absorber constituent and at least one lock constituent, the system comprising:
   a cavity for receiving the mixed constituent gas;
   a laser for providing a light beam of a specific spectral position and width in the cavity, the laser configured to be tuned across a laser tuning range, wherein a spectral ending point of the laser tuning range is locked relative to a wavelength and frequency of an absorption line of the at least one lock constituent;
   a plurality of mirrors for providing reflection of the light beam within the cavity;
   a detector for measuring the light beam; and
   a processor for determining (i) the measurement value of one or more constituents based on cavity ringdown in the presence of the at least one broad band absorber constituent and a reference concentration value when the cavity is free of the at least one broad band absorber constituent and (ii) when a spectral width of the laser tuning range is overlapped by an absorption band of the at least one broad band absorber constituent in the cavity, a temporal light intensity decrease due to absorption of the at least one broad band constituent as light exits the cavity during a cavity ringdown.

2. The system of claim 1, wherein the laser is locked at the spectral ending point corresponding to a spectral peak of the at least one lock constituent.

3. The system of claim 1, wherein the laser is locked at the spectral ending point corresponding to a spectral trough of the at least one lock constituent.

4. The system of claim 1, wherein the measurement value of one or more constituents is selected from the group consisting of: a concentration of one or more constituents, a partial pressure of one or more constituents, a number density of at least one constituent, and any combination of the preceding measurement values.

5. The system of claim 1, wherein the laser tuning range encompasses at least one spectral peak of the at least one lock constituent, and wherein an offset of the laser tuning range is locked relative to the lock constituent absorption line by adjusting a laser characteristic value to maintain and control an offset frequency position of the laser.

6. The system of claim 5, further comprising one of a PID controller and a fuzzy logic controller in a feedback loop for controlling the laser tuning range offset.

7. The system of claim 1, wherein the processor is configured to correct a concentration of the at least one broad band absorber constituent for any cross-sensitivity due to overlapping absorption from the at leaset one lock constituent using a fit concentration from a narrowband absorber.

8. The system of claim 1, wherein the at least one lock constituent is selected from the group consisting of $H_2O$, $CO_2$, $CH_4$, $N_2O$, $O_2$, $O$, $O_3$, $NO_2$, $NO$, $HF$, $CO$, $NH_3$, $H_2S$, $HCl$, $C_2H_6$, $C_2H_4$, $C_2H_2$, $H_2O_2$, $OCS$, $SO_2$, $SO_3$, and $COCl_2$.

9. The system of claim 1, wherein the at least one broad band absorber constituent is a molecular species that has at least one spectral absorption feature in its optical absorption spectrum and a spectral width at low pressure that is greater than the laser tuning range of the laser producing the light beam.

10. The system of claim 1, wherein a wavelength of the laser is tuned in the near-infrared spectral region, and wherein an absorption band of the at least one broad band absorber constituent and the absorption line of the at least one lock constituent overlap.

11. A method for determining a measurement value of a broad band absorber constituent in a gas mixture, the method comprising:
    reflecting a light beam in a cavity bounded by at least one mirror, the cavity containing the broad band absorber constituent and a lock constituent present in the gas mixture;
    measuring absorbance of the light beam in the cavity after interacting with the gas mixture;
    determining, by a processor, an absorption peak of the lock constituent in the gas mixture;
    locking a spectral position of the light beam relative to a wavelength and frequency of the absorption peak of the lock constituent;
    measuring light intensity decay over time, in the form of a ringdown trace, as the broad band absorber constituent absorbs radiation; and
    determining, by the processor, the measurement value of the broad band absorber constituent based on (i) the ringdown trace in the presence of the broad band absorber constituent and (ii) a cavity reference value representing a ringdown of the cavity without the broad band absorber constituent present.

12. The method of claim 11, wherein the measurement value is selected from the group consisting of: a concentration of the broad band absorber constituent, a partial pressure of the broad band absorber constituent, a number density of the broad band absorber constituent in the gas mixture, and combinations thereof.

13. The method of claim 11, wherein the cavity is bounded at two opposing ends by the at least one mirror.

14. The method of claim 11, further comprising:
    measuring a ring up value for the broad band absorber constituent in the gas mixture; and
    determining, by the processor, a concentration of the broad band absorber constituent using a difference between the ring up value and a value of the ringdown trace, a calibration coefficient relating the difference and the concentration of the broad band absorber constituent, and a concentration of the lock constituent.

15. The method of claim 11, wherein the cavity reference value is determined by evacuating the cell of the broad band absorber constituent to a value below the accuracy level of a spectroscopy instrument with which the method is carried out.

16. The method of claim 11, wherein the cavity reference value is determined by scrubbing the broad band absorber constituent from the gas mixture.

17. The method of claim 11, wherein a mean value of the at least two absorption peaks determines the lock frequency of the light beam.

18. The method of claim 11, further comprising:
    determining, by the processor, an absorption peak of the lock constituent in the gas mixture by a minimization technique fitting the spectral line shape of the lock constituent; and locking a spectral position of the light beam relative to a wavelength and frequency of the absorption peak of the fitted spectral line shape of the lock constituent.

19. The method of claim 11, further comprising:
reinjecting the light beam into the cavity at least once;
determining the absorption peak of the lock constituent in the gas mixture from the reflectance values; and
measuring light intensity decay over time from the reflectance values.

20. A method for determining a measurement value of a broad band absorber constituent in a gas mixture, the method comprising:
reflecting a light beam in a cavity bounded by at least one mirror, the cavity containing a gas mixture;
injecting a lock constituent into the gas mixture in the cavity;
measuring an absorbance of the light beam in the cavity as the light beam interacts with the gas mixture and exits out of the cavity;
determining one of an absorption peak or trough of the lock constituent in the gas mixture;
locking a spectral position of the light beam relative to a wavelength and frequency of the absorption peak of the lock constituent;
measuring light intensity decay over time, in the form of a ringdown trace, as the broad band absorber constituent absorbs radiation; and
determining, by a processor, the measurement value of the broad band absorber constituent based on (i) the cavity ringdown trace in the presence of the broad band absorber constituent and (ii) a cavity reference value representing a ringdown of the cavity without the broad band absorber constituent present.

21. A system for measuring a concentration of a broad band absorber constituent in a sample gas mixture, the system comprising:
an optical cavity for receiving the sample gas mixture, the cavity defined by a plurality of mirrors;
a laser for providing a light beam injected into the optical cavity, the laser configured to be tuned across a spectral range overlapping an absorption band of the broad band absorber constituent, a tuning rate being sufficiently slow that light in the optical cavity maintains a pseudo-steady state, the sample gas mixture also including a gas constituent with a narrowband absorption at a known spectral location within the spectral range of the tuned laser for use as a reference wavelength;
a detector for measuring intensity of light exiting the cavity;
a processor for receiving the intensity measurement from the detector as the laser is tuned across its spectral range, identifying the narrowband absorption, designating a subsequent shutoff point for the laser, determining a time constant t for cavity ringdown due to broadband absorption at the designated shutoff point, and computing from the time constant $\tau$ any one more of a concentration, partial pressure or number density of the broad band absorber constituent in the sample gas mixture; and
a laser driver responsive to the processor for repeatedly turning the laser off and on, and ramping drive current supplied to the laser to tune the laser over the spectral range until turned off at the designated shutoff point.

22. The system of claim 21, wherein the processor identifies the narrowband absorption from a measured intensity trough corresponding to an absorption peak as the laser is slowly tuned across its spectral range.

23. The system of claim 21, wherein a location of the narrowband absorption relative to the overall spectral range of laser tuning is locked by a feedback loop having one of a PID controller or fuzzy logic controller adjusting a temperature of the laser.

24. The system of claim 21, wherein the laser driver turns the laser off at a fixed shutoff point after identification of the narrowband absorption.

25. The system of claim 21, wherein the laser driver, in repeatedly turning the laser on and off, uses a variable set of shutoff points at different wavelengths after identification of the narrowband absorption.

* * * * *